United States Patent Office 2,714,106
Patented July 26, 1955

2,714,106

N-GLYCOLYLARSANILATE SALTS OF CHLOROQUINE

Emery W. Dennis and Alexander R. Surrey, Albany, N. Y., assignors to Sterling Drug Inc., New York, N. Y., a corporation of Delaware No Drawing. Application August 10, 1953, Serial No. 373,452

6 Claims. (Cl. 260—271)

This invention relates to derivatives of 7-chloro-4-(4-diethylamino-1-methylbutylamino)quinoline (chloroquine) and N-glycolylarsanilic acid (4-glycolylamidophenylarsonic acid). In particular, it relates to chloroquine di-(N-glycolylarsanilate) and chloroquine tri-(N-glycolylarsanilate), which have valuable amebacidal properties.

Of the antiamebic drugs presently available, those that are most effective in clearing *Endamoeba histolytica* from the intestine are ineffective against extraintestinal forms of the disease. Conversely, those drugs that are effective in the treatment of hepatic amebiasis are poor agents against intestinal amebiasis. Chloroquine, or 7-chloro-4-(4-diethylamino-1-methylbutylamino)quinoline, has been found to be a highly effective drug for the treatment of hepatic amebiasis, as well as malaria; however, it is relatively ineffective against intestinal amebiasis.

We have now found that N-glycolylarsanilate salts of chloroquine are highly effective as intestinal amebacides. This effectiveness has been demonstrated against *E. criceti* infections in hamsters and *E. histolytica* infections in humans. Thus, the compounds of our invention are dual-acting agents for concurrent treatment of both intestinal and extraintestinal forms of amebiasis.

The compounds of our invention were prepared by treating a solution of N-glycolylarsanilic acid in a polar solvent with the appropriate quantity of chloroquine. Thus, treatment of 2 moles of N-glycolylarsanilic acid with 1 mole of chloroquine yields chloroquine di-(N-glycolylarsanilate) and treatment of 3 moles of N-glycolylarsanilic acid with 1 mole of chloroquine yields chloroquine tri-(N-glycolylarsanilate). This process for preparing our compounds can be run at room temperature, although preferably at a higher temperature, e. g., effected by use of steam bath, because of the resultant greater rate of reaction. The chloroquine-N-glycolylarsanilate salts were isolated preferably by evaporation of the reaction solvent; alternatively, the salts can be obtained by precipitating them from the reaction mixture with an excess of the appropriate solvent, such as acetone.

The invention is further illustrated by the following examples but it is not limited thereto.

EXAMPLE 1

*Chloroquine tri-(N-glycolylarsanilate)*

To a hot solution of 45 g. of N-glycolylarsanilic acid (this sample contained 12.72% water) in 450 ml. of 80% ethanol was added 15.2 g. of 7-chloro-4-(4-diethylamino-1-methylbutylamino)quinoline. The hot solution was treated with decolorizing charcoal and filtered. The solvent was then removed by distillation in vacuo. The residue was stirred in about 300 ml. of acetone for about one hour. The acetone was then decanted and replaced by a fresh supply of acetone. By continued stirring and trituration with a glass rod, if necessary, the taffy-like material solidified. The solid was collected, dried at 60° C. overnight and then at 100° C. to constant weight.

This dried product, chloroquine tri-(N-glycolylarsanilate), a white crystalline solid, melted with decomposition at 158–160°. (cor.).

Anal.—Calcd. for $C_{18}H_{26}ClN_3 \cdot 3C_8H_{10}AsNO_5$: Chloroquine, 27.85; N-glycolylarsanilic acid, 72.15.

Found.—Chloroquine, 25.70 (dry basis); N-glycolylarsanilic acid by As, 72.85 (dry basis); loss in weight at 100° C., 1.19.

Chloroquine tri-(N-glycolylarsanilate) is soluble in water to the extent of at least 20%, the pH of a 1% solution being 3.7. When such an aqueous solution is adjusted with 0.1 N sodium hydroxide to a pH of 7.0, there is no precipitation.

The efficacy of chloroquine-tri-(N-glycolylarsanilate) in clearing intestinal amebiasis of hamsters (*Cricetus auratus*) was determined as follows: Preparations of chloroquine tri-(N-glycolylarsanilate) at varying concentrations were made up in 10% autoclaved gelatin in such a manner that 1.0 cc. contained the desired daily dose. Hamsters (100–110 g.), which were infected with *Endamoeba criceti*, were medicated by stomach tube twice daily for four days. On the fifth day they were autopsied and scrapings from the ceca were examined microscopically for the presence of trophozoites. Three microscopic examinations from different areas of the cecum were made before an animal was reported as being free from amebic infection. The combined results of several tests are tabulated in Table I.

TABLE I

| Dose, Mg./Kg./Day | Experimental Animals | |
|---|---|---|
| | No. Cleared | Percent |
| 12.5 | 0/5 | 0 |
| 15.0* | 1/5 | 20 |
| 20.0 | 10/10 | 100 |
| 25.0 | 10/10 | 100 |
| 30.0 | 10/10 | 100 |
| 37.5 | 5/5 | 100 |
| 50.0 | 5/5 | 100 |
| 60.0 | 5/5 | 100 |

*In two of the four hamsters positive for amebae at this dose level, very few amebae were found.

In addition to the above tests in hamsters, chloroquine tri-(N-glycolylarsanilate) has been found effective as an amebacidal agent in humans, a study having been carried out in four patients. Two of these patients have had acute exacerbations of amebiasis over 15-year periods and were put on a regimen of 750 mg. of chloroquine tri-(N-glycolylarsanilate) three times daily for one week. Follow-up stool examinations at the end of four weeks showed both patients to be free of amebae. Subsequent stool examinations were still negative for *E. histolytica* at the end of thirteen weeks. The remaining two patients had acute dysentery and were placed on the same regimen. Stools taken at the end of medication and at the end of four weeks were negative for pathogenic amebae.

EXAMPLE 2

*Chloroquine di-(N-glycolylarsanilate)*

This preparation was carried out following the procedure described in Example 1 using 6.3 g. of N-glycolylarsanilic acid (contained 12.72% water), 65 cc. of 80% ethanol and 3.19 g. of 7-chloro-4-(4-diethylamino-1-methylbutylamino)quinoline. There was thus obtained 7.5 g. (86%) yield of the product, chloroquine di-(N-glycolylarsanilate), M. P. 158–161° C. with decomposition (when immersed in bath at 120° C.).

Anal.—Calcd. for $C_{18}H_{26}ClN_3 \cdot 2C_8H_{10}AsNO_5$: Chloroquine, 36.75; As, 17.25.

Found.—Chloroquine, 34.40; As, 18.08.

In another run the product when dried at about 60° C. retained about 8% water of hydration and melted at 85.4–88.4° C. (cor.) with decomposition.

Chloroquine di-(N-glycolylarsanilate) is soluble in water to the extent of at least 20%, the pH of a 1% solution being 5.2. When such an aqueous solution is adjusted with 0.1 N sodium hydroxide to a pH of 7.0, there is no precipitation.

When tested for amebacidal activity in hamsters according to the procedure described above in Example 1, chloroquine di-(N-glycolylarsanilate) was found to be active as summarized in Table II.

TABLE II

| Dose, Mg./Kg./Day | Experimental Animals | |
|---|---|---|
| | No. Cleared | Percent |
| 25 | 3/10 | 30 |
| 30 | 6/10 | 60 |
| 37.5 | 5/5 | 100 |
| 50 | 5/5 | 100 |
| 60 | 5/5 | 100 |

We claim:

1. A compound selected from the group consisting of the di- and tri-(N-glycolylarsanilate) salts of 7-chloro-4-(4-diethylamino-1-methylbutylamino)quinoline.

2. 7 - chloro-4-(4-diethylamino-1-methylbutylamino)-quinoline di-(glycolylarsanilate).

3. 7 - chloro-4-(4-diethylamino-1-methylbutylamino)-quinoline tri-(N-glycolylarsanilate).

4. The process for the preparation of a compound selected from the group consisting of the di- and tri-(N-glycolylarsanilate) salts of 7-chloro-4-(4-diethylamino-1-methylbutylamino)quinoline, which comprises treating a solution containing a member of the group consisting of two and three moles of N-glycolylarsanilic acid in a polar solvent with 1 mole of 7-chloro-4-(4-diethylamino-1-methylbutylamino)quinoline.

5. The process for the preparation of 7-chloro-4-(4-diethylamino-1-methylbutylamino)quinoline di - (N-glycolylarsanilate) which comprises treating a solution containing 2 moles of N-glycolylarsanilic acid in a polar solvent with 1 mole of 7-chloro-4-(4-diethylamino-1-methylbutylamino)quinoline.

6. The process for the preparation of 7-chloro-4-(4-diethylamino-1 - methylbutylamino)quinoline tri-(N-glycolylarsanilate) which comprises treating a solution containing 3 moles of N-glycolylarsanilic acid in a polar solvent with 1 mole of 7-chloro-4-(4-diethylamino-1-methylbutylamino)quinoline.

References Cited in the file of this patent

UNITED STATES PATENTS 2,675,389   Delmer _____ Apr. 13, 1954

OTHER REFERENCES

Surrey et al., J. A. C. S. 68: 113–6, January 18, 1946.